(12) United States Patent  (10) Patent No.: US 8,123,063 B2
Kanda et al.  (45) Date of Patent: Feb. 28, 2012

(54) CARTRIDGE TANK FOR LUBRICATION AGENT

(75) Inventors: Norio Kanda, Sakuragawa (JP); Keizo Saito, Shinjuku-ku (JP)

(73) Assignee: Lube Co., Ltd., Tokyo (JP)

( * ) Notice: Subject to any disclaimer, the term of this patent is extended or adjusted under 35 U.S.C. 154(b) by 121 days.

(21) Appl. No.: 12/733,500

(22) PCT Filed: Sep. 4, 2008

(86) PCT No.: PCT/JP2008/065929
§ 371 (c)(1),
(2), (4) Date: Mar. 4, 2010

(87) PCT Pub. No.: WO2009/031601
PCT Pub. Date: Mar. 12, 2009

(65) Prior Publication Data
US 2010/0181327 A1  Jul. 22, 2010

(30) Foreign Application Priority Data
Sep. 6, 2007 (JP) .................................. 2007-231466

(51) Int. Cl.
B65D 6/16 (2006.01)
B65D 41/32 (2006.01)
B05B 1/00 (2006.01)

(52) U.S. Cl. ............ 220/229; 220/666; 222/89; 222/633

(58) Field of Classification Search .................. 220/601, 220/229, 666; 222/89, 633, 185.1; 141/330
See application file for complete search history.

(56) References Cited

U.S. PATENT DOCUMENTS

| 4,053,084 | A | * | 10/1977 | Anderson | 220/229 |
| 4,308,885 | A | * | 1/1982 | Geisseler | 137/67 |
| 4,972,976 | A | | 11/1990 | Romero | |
| 5,147,065 | A | | 9/1992 | Rush et al. | |
| 6,196,281 | B1 | * | 3/2001 | Schwallie et al. | 141/330 |
| 2003/0042257 | A1 | | 3/2003 | Uchiyama | |
| 2003/0196984 | A1 | * | 10/2003 | Uchiyama | 215/247 |
| 2004/0222224 | A1 | * | 11/2004 | Plester | 220/203.17 |
| 2005/0150888 | A1 | * | 7/2005 | Birkmeier | 220/229 |

FOREIGN PATENT DOCUMENTS

| JP | U-H06-10168 | 2/1994 |
| JP | H08-053147 | 2/1996 |
| JP | 2001-173887 | 6/2001 |
| JP | 2003-252385 | 9/2003 |
| JP | 2007-182978 | 7/2007 |

* cited by examiner

*Primary Examiner* — Mickey Yu
*Assistant Examiner* — Niki Eloshway
(74) *Attorney, Agent, or Firm* — Manabu Kanesaka

(57) ABSTRACT

A cartridge tank for a lubrication agent which includes a container main body 10 in which a lubrication agent is sealed and an installation mouth part 20 which protrudes from the container main body and is provided with an opening 21 into which an oil-supply mouth part 7 of a lubrication pump 1 is inserted, wherein the cartridge tank is provided with a cover plug 40 which covers the opening of said installation mouth part, and the cover plug has a cut groove 41 which is to be cut by the oil-supply mouth part when the installation mouth part is installed in the concave part 4 of the lubrication pump, and the cut groove is provided with a circular circumferential groove 42 having a diameter greater than the diameter of the oil-supply mouth part and a plurality of vertical grooves 43 formed from the center of the circular circumferential groove to the circular circumferential groove.

3 Claims, 7 Drawing Sheets

CARTRIDGE TANK FOR LUBRICATION AGENT

RELATED APPLICATIONS

The present application is based on inter national Application No. PCT/JP2008/065929, filed Sep. 4, 2008, and claims priority from, Japanese Application Number 2007-231466, filed Sep. 6, 2007, the disclosure of which is hereby incorporated by reference herein in its entirety.

TECHNICAL FIELD

The present invention relates to a cartridge tank which is attached to various lubrication pumps which supply to machine tools, industrial tools or the like a fluid lubrication agent such as grease and oil for the purpose of lubrication or the like. In particular, the present invention relates to a disposal-type cartridge tank for a lubrication agent.

BACKGROUND ART

Generally, as shown in FIG. 10, a lubrication pump in which a cartridge tank is used is provided with a pump part 3 which is driven by means of a motor 2, a concave part 4 in which female screw threads 4a are provided, and a tubular oil-supply mouth part 7 which protrudes from a bottom surface 6 of the concave part 4. The pump part 3 discharges a lubrication agent which has been supplied from a cartridge tank Ta for a lubrication agent which is detachably attached to the oil-supply mouth part 7 to a lubrication part of a machine.

As the cartridge tank Ta for a lubrication agent, one shown in FIG. 10 has heretofore been used. This cartridge tank Ta for a lubrication agent is provided with a flexible, bellow cylindrical container main body 10 made of a resin which seals a lubrication agent, and an installation mouth part 20 which has male screw threads 23 corresponding to the female screw threads 4a formed in the concave part 4 of a lubrication pump 1 and provided with an opening 21 in which the oil-supply mouth part 7 is inserted. This installation mouth part 20 is formed such that it protrudes and has a cylindrical shape with a small diameter with the axial line of the container main body 10 being as the axial core, and is detachably attached to the concave part 4 of the lubrication pump 1 (see JP-A-2001-173887, for example).

Installation of such cartridge tank Ta for a lubrication agent to the lubrication pump 1 is conducted by screwing male screw threads 23 of the installation mouth part 20 to the female screw threads 4a in the concave part 4 of the lubrication pump 1.

Specifically, the cartridge tank Ta for a lubrication agent normally has a configuration in which a cap (not shown) having female screw threads into which the male screw threads 23 are screwed is installed in the installation mouth part 20. Therefore, at first, this cap is removed from the installation mouth part 20. In this state, the container main body 10 is inverted to allow the installation mouth part 20 to direct downward, and the installation mouth part 20 is inserted into the concave part 4 of the lubrication pump 1, and the container main body 10 is rotated to allow the male screw threads 23 of the installation mouth part 20 to be screwed into the female screw threads 4a of the concave part 4 of the lubrication pump 1.

Subsequently, this cartridge tank Ta for a lubrication agent is covered with a case 30 in which a coil spring 31 pressing a bottom part 11 of the cartridge tank Ta for a lubrication agent is provided, and then, this case 30 is fixed to the lubrication pump 1 by means of a vis or the like. As a result, when the lubrication pump 1 is used, the cartridge tank Ta for a lubrication agent is normally pressed by means of the coil spring 31, and a lubrication agent is pushed out from the oil-supply mouth part 7.

When a lubrication agent is run out, the cartridge tank Ta for a lubrication agent is replaced with a new one.

Patent Document 1: JP-A-2001-173887

In this conventional cartridge tank Ta for a lubrication agent, when a normal lubrication agent with a relatively high viscosity is sealed, no leakage of a lubrication agent from the installation mouth part 20 occurs even though the container main body 10 is inverted when the installation mouth part 20 is attached to the lubrication pump 1. However, in recent years, there are some cases where a lubrication agent with a low viscosity is sealed in the cartridge tank Ta for a lubrication agent. In such a case, a lubrication agent may be leaked from the installation mouth part 20 by the action of gravity during a period between the removal of the cap and the installation of the container main body 10 by inverting it and screwing the male screw threads 23 of the installation mouth part 20 into the female screw threads 4a of the concave part 4 of the lubrication pump 1.

The present invention has been made in view of the above-mentioned problems, and the object thereof is to provide a cartridge tank for a lubrication agent which can prevent leakage of a lubrication agent when the tank is attached to a lubrication pump even if a lubrication agent with a low viscosity is sealed.

DISCLOSURE OF THE INVENTION

In order to attain the object, the cartridge tank for a lubrication agent of the present invention is a cartridge tank for a lubrication agent which comprises a container main body in which a lubrication agent is sealed and an installation mouth part which protrudes from the container main body and is provided with an opening into which an oil-supply mouth part of a lubrication pump is inserted, wherein the cartridge tank for a lubrication agent is provided with a cover plug which covers the opening of said installation mouth part, and the cover plug has a cut groove which is to be cut by the oil-supply mouth part when the installation mouth part is installed in the concave part of the lubrication pump.

Further, the cartridge tank for a lubrication agent according to the present invention has a configuration in which the cut groove is provided with a circular circumferential groove having a diameter greater than the diameter of the oil-supply mouth part and a plurality of vertical grooves formed from the center of the circular circumferential groove to the circular circumferential groove.

The cartridge tank for a lubrication agent according to the present invention has a configuration in which hinges are provided for supporting a plurality of sections, which are formed when the circular groove and the vertical grooves are cut on outer periphery part formed outside the circular circumferential groove of the cover plug.

The cartridge tank for a lubrication agent according to the present invention has a configuration in which a circular protrusion which abuts the bottom surface of the concave part of the lubrication pump, on which the installation mouth part is installed, is provided on the front surface of the outer periphery part.

The cartridge tank for a lubrication agent according to the present invention has a configuration in which a circular protrusion which abuts the end of the installation mouth part is installed is provided on the back surface of the outer periphery part.

The cartridge tank for a lubrication agent according to the present invention has a configuration in which an inwardly-directed engagement concave part, is formed along the peripheral edge of the outer peripheral part and an outwardly-directed engagement convex part, which is engaged with the engagement concave part is formed along the outer side edge of the end of the installation mouth part.

According to the cartridge tank for a lubrication agent according to the present invention, since the opening of the installation mouth part is covered by the cover plug, when this cartridge tank for a lubrication agent is attached to the lubrication pump, leakage of a lubrication agent from the installation mouth part can be prevented if a lubrication agent with a low viscosity is used. In addition, when the installation mouth part is inserted into the concave part of the lubrication pump, since the cut groove of the cover plug is cut by the oil-supply mouth part of the lubrication pump, the oil-supply mouth part is inserted into an opening of the oil-supply mouth part, whereby the lubrication agent which has been sealed inside the container main body is allowed to be supplied to the lubrication pump. Specifically, while the lubrication agent which is sealed in the container main body is not leaked from the container main body until the installation mouth part is fitted to the concave part of the lubrication pump, the lubrication agent is run out from the container main body so as to be supplied to the lubrication pump after the cartridge tank for a lubrication agent is attached to the lubrication pump.

BEST MODE FOR CARRYING OUT THE INVENTION

The cartridge tank for a lubrication agent according to an embodiment of the present invention will be explained hereinbelow with reference to FIGS. 1 to 9. The same symbols are used to indicate the same parts as mentioned above.

Figure 1:
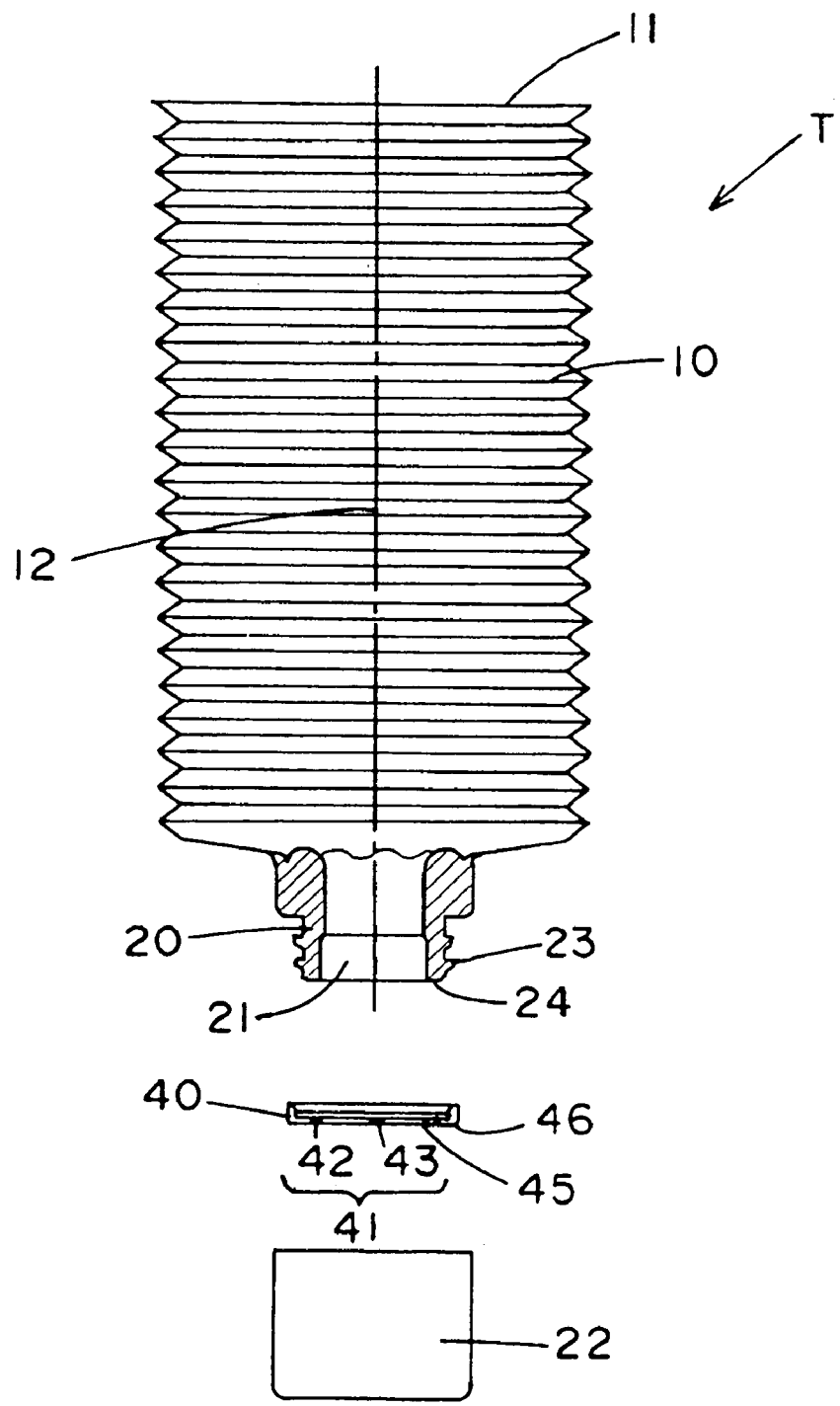
FIG. 1 is a side view showing a cartridge tank for a lubrication agent according to an embodiment of the present invention.
Figure 2:
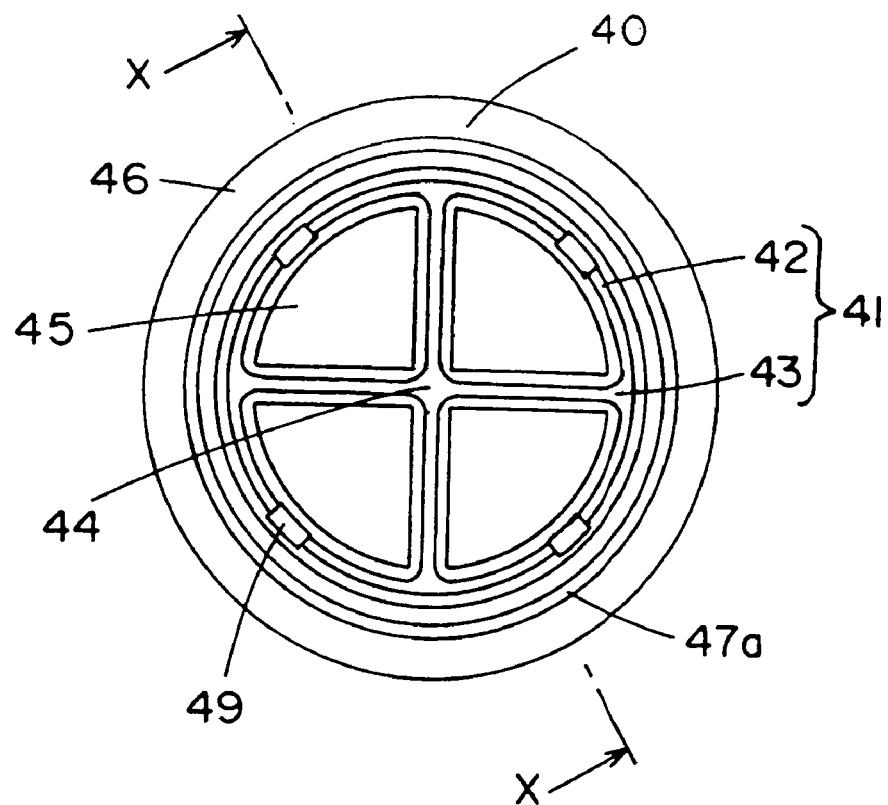
FIG. 2 is a plan view showing a cover plug according to an embodiment of the present invention.
Figure 3:
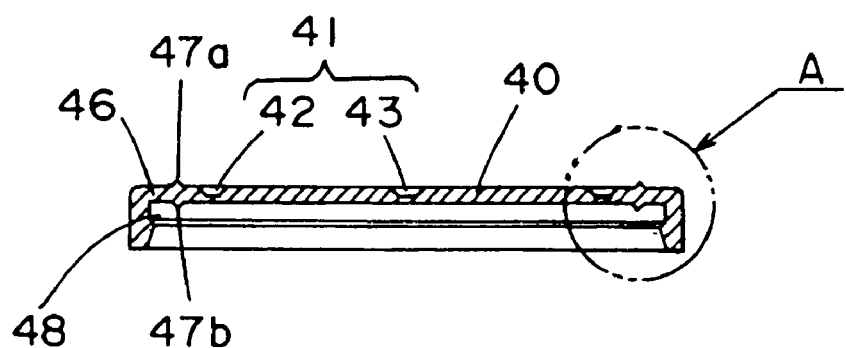
FIG. 3 is a cross-sectional view showing the cover plug according to an embodiment of the present invention, taken along line X-X.
Figure 4:
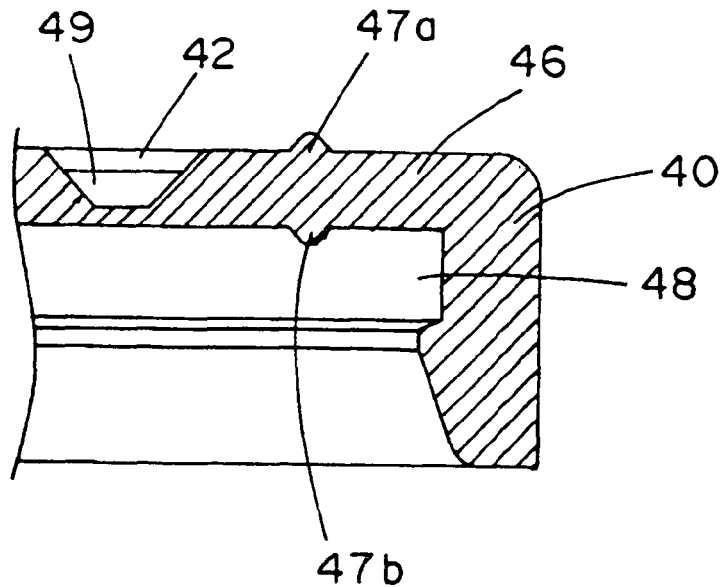
FIG. 4 is an enlarged view of part A in FIG. 3.
Figure 5:
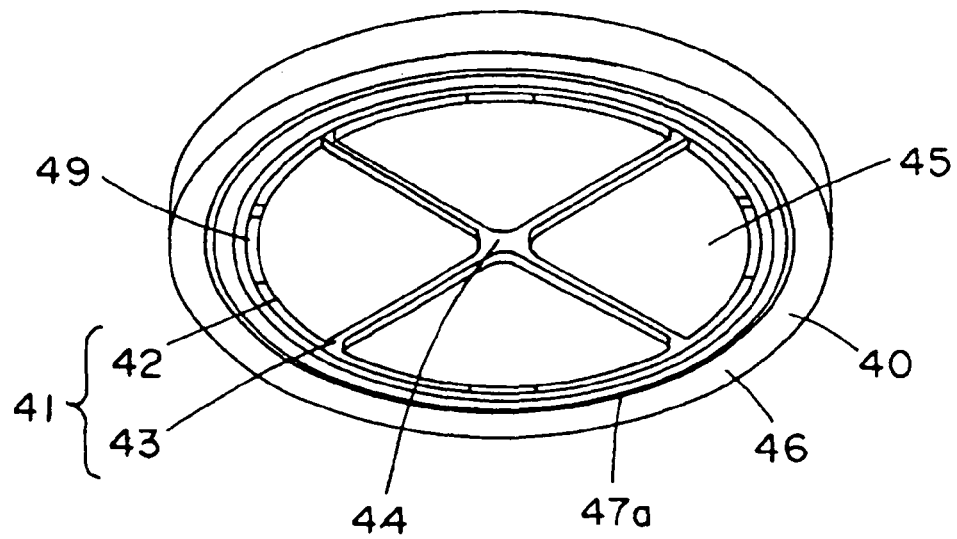
FIG. 5 is a perspective view showing the cover plug according to an embodiment of the present invention.
Figure 5:
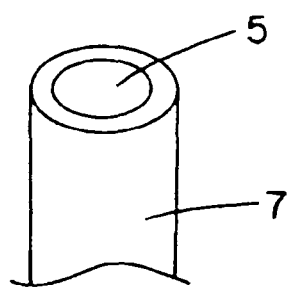
Figure 6:
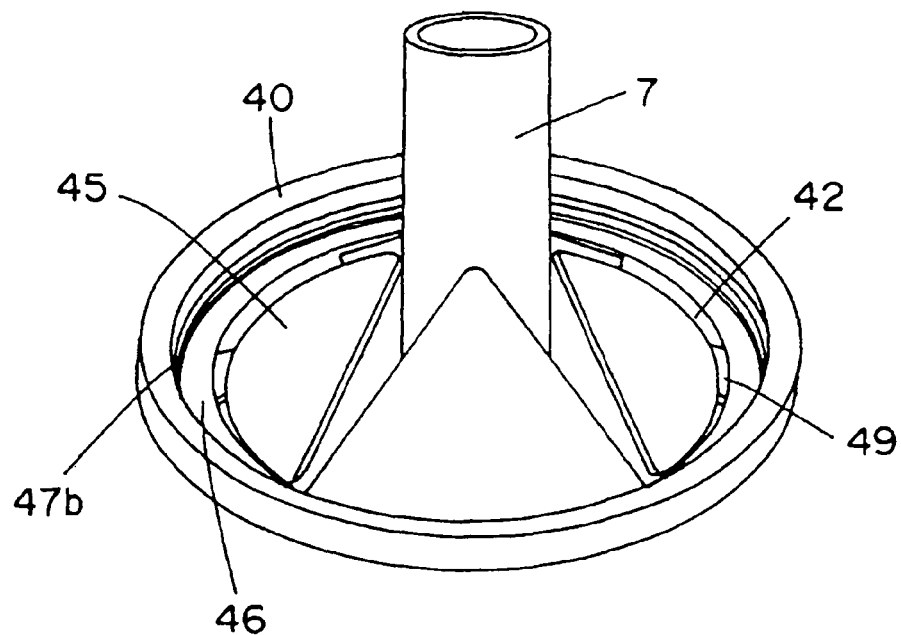
FIG. 6 is a perspective view showing the state where the cut grooved of the cover plug according to an embodiment of the present invention are cut.
Figure 7:
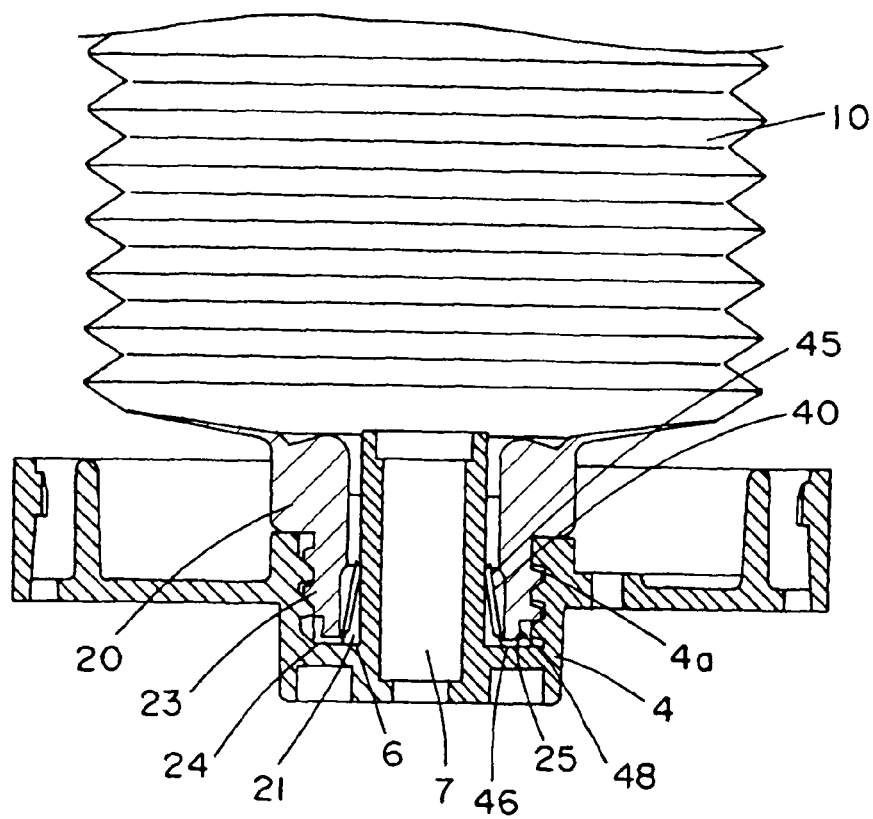
FIG. 7 is a side view showing the part where the cartridge tank for a lubrication agent according to an embodiment of the present invention is fitted to a lubrication pump.
Figure 9:
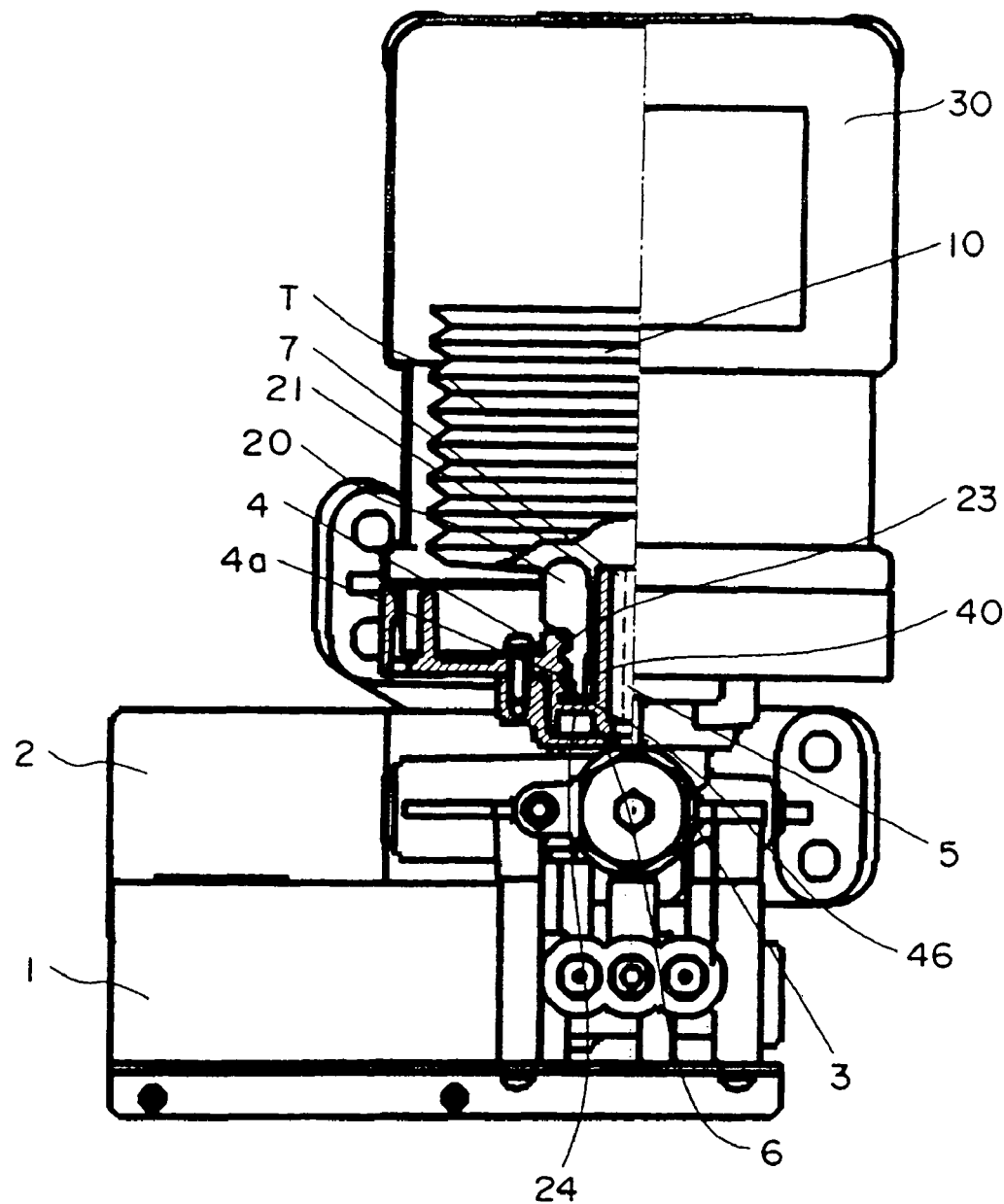
FIG. 9 is a half-cross sectional view showing the state where the cartridge tank for a lubrication agent according to an embodiment of the present invention is attached to a lubrication pump.
Figure 10:
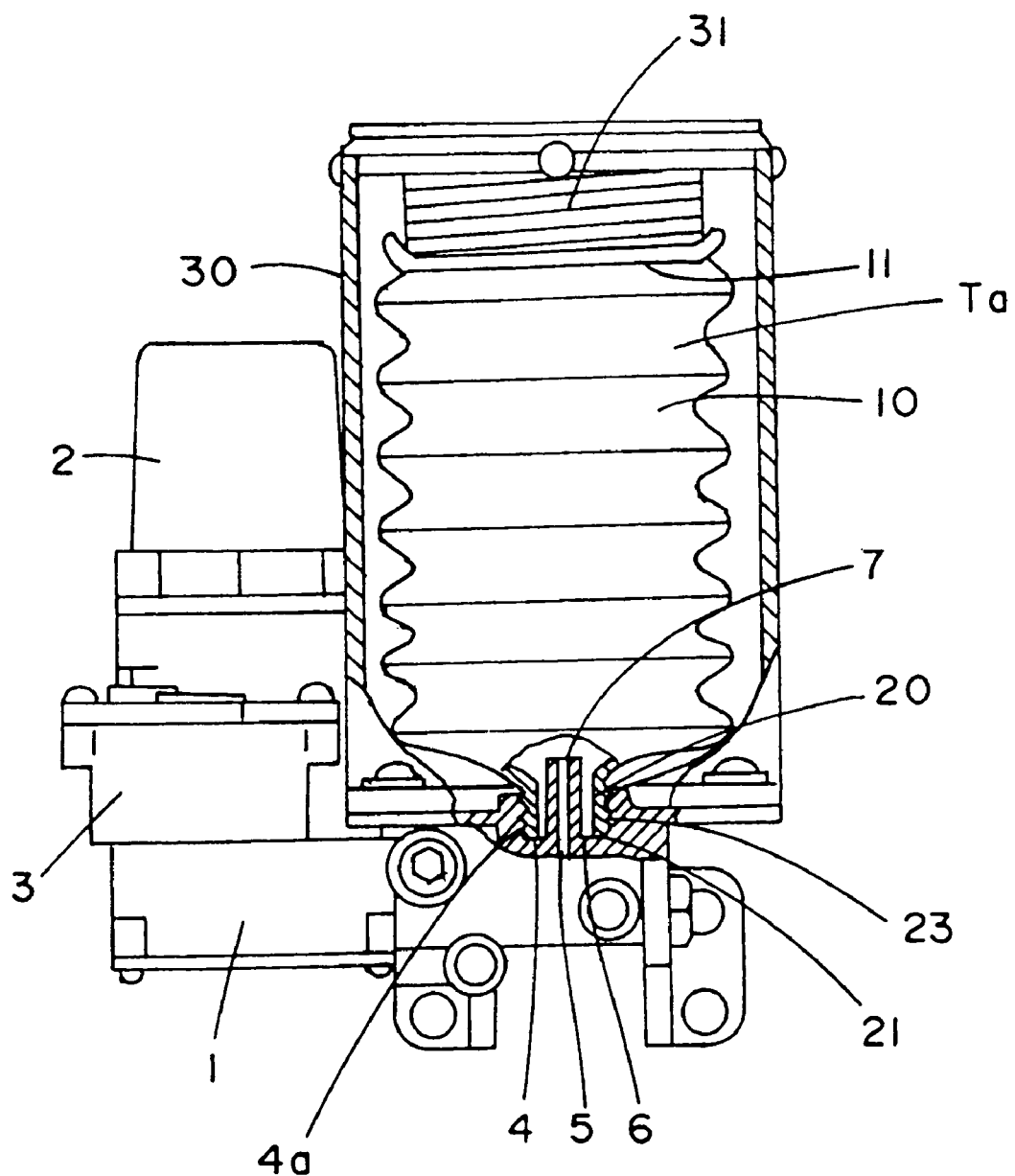
FIG. 10 is a view showing one example of conventional cartridge tanks for a lubrication agent.

The cartridge tank T for a lubrication agent according to the embodiment is fitted to a lubrication pump 1 shown in FIGS. 7 and 9. The lubrication pump 1 is provided with a pump part 3 which is driven by a motor 2 and a tubular oil-supply mouth part 7 which has an inlet 5 for a lubrication agent and is protruded from the bottom surface 6 of a concave part 4 in which the female screw threads 4a are formed. This lubrication pump 1 allows a lubrication agent supplied from the cartridge tank T for a lubrication agent which is detachably attached to the oil-supply mouth part 7 to be discharged. This lubrication pump 1 is provided with a detachable cover 30 for protecting or the like of the cartridge tank T for a lubrication agent.

As for the basic configuration of the cartridge tank T for a lubrication agent according to this embodiment, the cartridge tank T is provided with a container main body 10, an installation mouth part 20 and a cover plug 40.

The container main body 10 is made of a transparent or semi-transparent resin and formed in a bellow cylindrical shape. A soft lubrication agent having a low viscosity is sealed in this container main body 10. As the lubrication agent, while grease is mainly used, oil may be used.

The installation mouth part 20 is protruded from the container main body 10 with the axial line 12 of the container main body 10 being as the axial core and has an opening 21 into which the oil-supply mouth part 7 of the lubrication pump 1 is inserted. This opening 21 is normally closed by a cap 22. On the outer side surface of this installation mouth part 20, male screw threads 23 to be screwed into female screw threads 4a formed in the concave part 4 of the lubrication pump 1 are formed. Further, along the outer side edge of an end 24 formed on the top of the installation mouth part 20, an outwardly-directed engagement convex part 25 is formed.

The cover plug 40 serves to cover the opening 21 of the installation mouth part 20 and is formed of a resin. In this cover plug 40, a thin, cut groove 41 is formed. This cut groove 41 is cut by the oil-supply mouth part 7 when the oil-supply mouth part 7 of the lubrication pump 1 is inserted into the opening 21 of the installation mouth part 20. This cut groove 41 is formed of a circular groove 42 and vertical grooves 43.

The circumference groove 42 is formed in a circular shape which has a diameter larger than the bore of the oil-supply mouth part 7 of the lubrication pump 1 but smaller than the bore of the opening 21 of the installation mouth part 20.

A plurality of vertical grooves 43 are formed between a center 44 of the circumferential groove 42 and the circumferential groove 42. In this embodiment, four vertical grooves are formed in a criss-cross pattern.

A plurality of sections 45 are formed in a region surrounded by the circumferential groove 42 and the vertical grooves 43. In this embodiment, four sections are formed.

An outer peripheral part 46 is formed outside the circumferential groove 42. On the front surface of the outer peripheral part 46, a circular projection 47a which abuts the bottom surface 6 in the concave part 4 of the lubrication pump 1 is provided, and on the back surface of the outer peripheral part 46, a circular protrusion 47b which abuts the end 24 of the installation mouth part 20 is provided. Further, along the circumference edge of the outer peripheral part 46, an inwardly-directed concave part 48, with which an engagement concave part 25 formed on the installation mouth part 20 is engaged, is formed.

Further, hinges 49, which support each of the plurality of sections 45 when the cut groove 41 is cut are provided in this cover plug 40. These hinges 49 are provided between the section 45 and the outer peripheral part 46, and the section 45 and the outer peripheral part 46 are connected via this hinge 49.

A lubrication agent is sealed in the cartridge tank T for a lubrication agent in the following manner.

A lubrication agent is poured from the top portion of the installation mouth part 20 through the opening 21. After a certain amount is poured, the engagement concave part 48 of the cover plug 40 is engaged with the engagement convex part 25 formed in the installation mouth part 20, whereby the opening 21 of the installation mouth part 20 is covered with the cover plug 40.

When pouring a lubrication agent in the cartridge tank T for a lubrication agent, a lubrication agent may be attached to the end 24 formed on the top of the installation mouth part 20. In this case, for example, if the opening 21 of the installation mouth part 20 is covered with the cover plug 40 formed of paper, adhesiveness between the cover plug 40 and the installation mouth part 20 is deteriorated due to a lubrication agent which has been attached to the end 24 of the installation mouth part 20, and as a result, the cover plug 40 cannot be retained sufficiently. However, in the case of the cover plug 40 in this embodiment, since the engagement concave part 48 of the cover plug 40 is engaged with the engagement convex part 25 of the installation mouth part 20 so as to allow the cover plug 40 to be attached to the installation mouth part 20, the cover plug 40 can be retained without fail even though a lubrication agent is attached to the end 24 of the installation mouth part 20.

Figure 8:
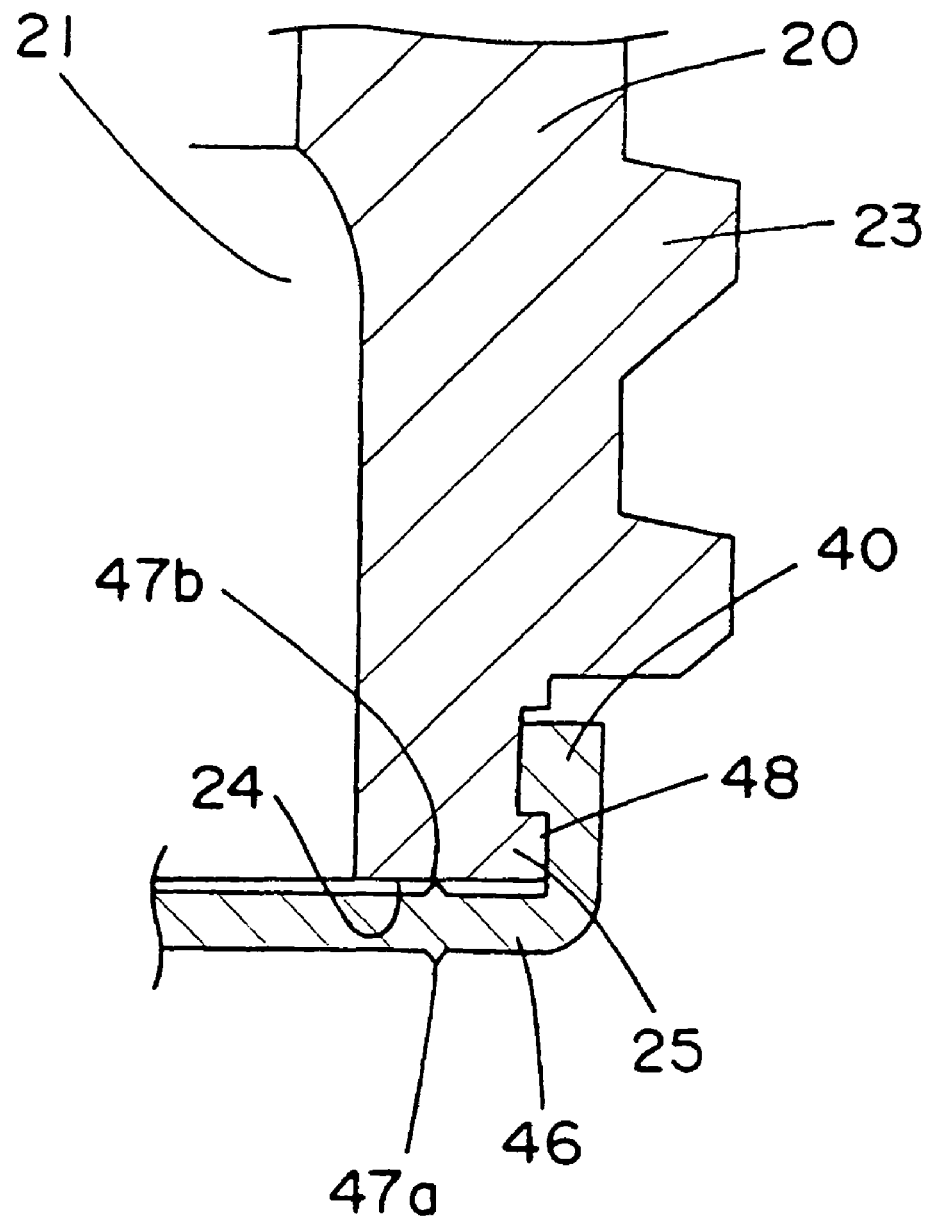
FIG. 8 is a partially enlarged view showing a part where the cover plug according to an embodiment of the present invention is fitted to an installation mouth part.

In addition, the circular protrusion 47b is provided on the back surface of the outer periphery part 46 of the cover plug 40. As shown in FIG. 8, when the cover plug 40 is attached to the installation mouth part 20, this protrusion 47b abuts the end 24 of the installation mouth part 20, whereby the backside of the outer peripheral part 46 and the end 24 of the installation mouth part 20 are adhered with each other in a liner contact state. As compared with the case where the back surface of the outer peripheral part 46 is adhered to the end 24 of the installation mouth part 20 in a surface contact manner, an improved sealing property can be attained when the back surface of the outer peripheral part 46 is adhered to the end 24 of the installation mouth part 20 in a linear contact state, since in the case of the linear contact, a larger pressure is imposed on the contact region.

After the cover plug 40 is installed on the installation mouth part 20, a cap 22 is put on the installation mouth part 20 from the top of the cover plug 40.

This cartridge tank T for a lubrication agent is attached to the lubrication pump 1 in the following manner.

At first, a cover 30 is removed from the lubrication pump 1. Further, the cap 22 on the installation mouth part 20 of the cartridge tank T for a lubrication agent is removed. In this state, the container main body 10 is inverted to allow the installation mouth part 20 to direct downwardly. In this case, since the opening 21 of the installation mouth part 20 is covered by the cover plug 40, a lubrication agent is not leaked from the installation mouth part 20 even though a lubrication agent with a low viscosity is used.

Then, the installation mouth part 20 of the cartridge tank T for a lubrication agent is inserted into the concave part 4, and the container main body 10 is rotated to allow the male screw threads 23 of the installation mouth part 20 to be screwed to the female screw threads 4a of the concave part 4 of the lubrication pump 1. Thereafter, the cover 30 is put on the lubrication pump 1.

When installing the cartridge tank T for a lubrication agent, since the center of the cover plug 40 and the axial core of the installation mouth part 20 are provided on the same axial line, the axial core of the oil-supply mouth part 7 is positioned on the same axial line. Therefore, when an attempt is made to insert the installation mouth part 20 to the concave part 4 of the lubrication pump 1, the oil-supply mouth part 7, which is projected on the bottom surface 6 of the concave part 4, is brought into contact with a region which is approximately middle of the front surface of the cover plug 40. If the installation mouth part 20 is inserted in this state, the vertical grooves 43 are cut from the middle part of the cover plug 40 by the oil-supply mouth part 7, and the four sections 45 are lifted by the oil-supply mouth part 7 with the center of the cover plug 40 being an apex. As a result, the circumferential groove 42 is cut, and the sections 45 are entered in the container main part 10. If the cut groove 41 is cut, the oil-supply mouth part 7 is inserted into the opening 21 of the installation mouth part 20, and the male screw threads 23 of the installation mouth part 20 are screwed in the female screw threads 4a of the concave part 4 of the lubrication pump 1.

At this time, since the section 45 is supported by the hinge 49, the section 45 is connected to the outer peripheral part 46 via the hinge 49. Therefore, there is no case where the section 45 is removed from the cover plug 40 to move freely within the container main body 10. As a result, it becomes possible to prevent the sections 45 from moving freely within the container main body 10 to block an inlet 5 of the oil-supply part 7, thus ensuring the supply of a lubrication agent to the lubrication pump 1.

When the male screw threads 23 of the installation mouth part 20 are screwed into the female screw threads 4a of the concave part 4 of the lubrication pump 1, the circular protrusion 47a provided on the front surface of the outer periphery part 46 of the cover plug 40 abuts the bottom surface 6 of the concave part 4. At this time, this protrusion 47a allows the front surface of the outer peripheral part 46 to adhere to the bottom surface 6 of the concave part 4 in a linear contact manner. Therefore, also in this case, as compared with the case where the front surface of the outer peripheral part 46 is adhered to the bottom surface 6 of the concave part 4 in a surface contact manner, an improved sealing property can be obtained when the front surface of the outer peripheral part 46 is adhered to the bottom surface 6 of the concave part 4 in a linear contact manner, since in the case of linear contact, a larger pressure is imposed on the contact region.

As a result, the inlet 5 of the oil-supply mouth part 7 and the inside of the container main body 10 are intercommunicated, whereby a lubrication agent sealed inside the container main body 10 is supplied to the lubrication pump 1 through the inlet 5 of the oil-supply mouth part 7. That is, a lubrication agent sealed inside the container main body. 10 is not leaked from the container main body 10 during a period between the removal of the cap 22 and the inversion of the container main part 10 so as to allow it to be screwed into the installation mouth part 20. However, after the cartridge tank T for a lubrication agent is installed in the lubrication pump 1, a lubrication agent is flown out from the container main body 10 and supplied to the lubrication pump 1.

Operating the lubrication pump 1 with which the cartridge tank T for a lubrication agent being installed is conducted as follows.

The pump part 3 of the lubrication pump 1 is driven so as to allow a lubrication agent supplied from the oil-supply mouth part 7 to be discharged, and is then supplied to a movable part or the like of an apparatus, which is not shown. When the lubrication pump 1 is operated, a lubrication agent is emitted from the container main body 10 of the cartridge tank T for a lubrication agent.

If a lubrication agent in the cartridge tank T for a lubrication agent is run out, the cartridge tank is replaced with a new cartridge tank T for a lubrication agent. For the replacement, at first, the pump part 3 of the lubrication pump 1 is stopped, and the container main body 10 is rotated to remove the installation mouth part 20 of the cartridge tank T for a lubrication agent from the concave part 4 of the lubrication pump 1. At this time, since the sections 45 of the cover plug 40 are connected to the outer peripheral part 46 through the hinges 49, removal of the sections 45 can be prevented.

After the cartridge tank T for a lubrication agent, which has been used, is removed from the lubrication pump 1, a new cartridge tank T for a lubrication agent is installed in the lubrication pump 1 in the same manner as mentioned above.

In the above-mentioned embodiment, the container main body 10 is formed in a bellow cylindrical shape. The shape of the container main body 10 is, however, not limited thereto. For example, it may be in any shape such as a cylindrical shape, and can be changed appropriately.

In the above-mentioned embodiment, four sections 45 are formed. The number of the section 45 is not limited thereto, and can be changed appropriately.

Further, in the above-mentioned embodiment, the cut groove 41 is composed of the circumference groove 42 and the vertical grooves 43. The configuration is, however, not limited thereto. Any type of groove is possible, and the configuration of the groove may be changed appropriately.

In the above-mentioned embodiment, four vertical grooves 43 are formed, but the number of the vertical groove 43 is not limited thereto, and can be changed appropriately.

The invention claimed is:

1. A cartridge tank for a lubrication agent, comprising:
   a container main body in which a lubrication agent is sealed;
   an installation mouth part which protrudes from the container main body and is provided with an opening into which an oil-supply mouth part of a lubrication pump is inserted; and
   a cover plug covering the opening of the installation mouth part,
   wherein the cover plug has
      a cut groove having a circular circumferential groove having a diameter greater than a diameter of the oil-supply mouth part and a plurality of vertical grooves formed from a center of the circular circumferential groove to the circular circumferential groove, the cut groove is to be cut by the oil-supply mouth part when the installation mouth part is installed in a concave part of the lubrication pump,
      an outer periphery part formed outside of the circumferential groove,
      a circular protrusion formed on a front surface of the outer periphery part which abuts a bottom surface of the concave part of the lubrication pump, and
      another circular protrusion opposing to the circular protrusion formed on a back surface of the outer periphery part which abuts an end of the installation mouth part.

2. The cartridge tank for a lubrication agent according to claim 1, wherein the cover plug has
   a plurality of sections formed when the circular groove and the vertical grooves are cut and surrounded by the circumferential groove and the vertical groove, and
   a plurality of hinges formed between the plurality of sections and the outer periphery part supporting the plurality of sections on the outer periphery part.

3. The cartridge tank for a lubrication agent according to claim 2, wherein the installation mouth part has an inwardly-directed engagement concave part which is formed along a peripheral edge of the outer periphery part, and
   the engagement concave part engages with an outwardly-directed engagement convex part formed along an outer side edge of the end of the installation mouth part.

* * * * *